(12) United States Patent
Graham et al.

(10) Patent No.: US 11,999,058 B2
(45) Date of Patent: Jun. 4, 2024

(54) METHOD AND APPARATUS FOR ROBOTIC ARM NAVIGATION

(71) Applicants: General Electric Company, Schenectady, NY (US); OLIVER CRISPIN ROBOTICS LIMITED, Altrincham (GB)

(72) Inventors: Andrew Crispin Graham, Badminton (GB); Julian Matthew Foxall, Bristol (GB); Rafael S. Brada, Hod-Hasharon (IL); Guy Ben-Yosef, Tel-Aviv (IL)

(73) Assignees: General Electric Company, Schenectady, NY (US); OLIVER CRISPIN ROBOTICS LIMITED, Altrincham (GB)

( * ) Notice: Subject to any disclaimer, the term of this patent is extended or adjusted under 35 U.S.C. 154(b) by 57 days.

(21) Appl. No.: 17/712,403

(22) Filed: Apr. 4, 2022

(65) Prior Publication Data
US 2023/0311303 A1 Oct. 5, 2023

(51) Int. Cl.
*B25J 9/16* (2006.01)
*B25J 9/06* (2006.01)
(Continued)

(52) U.S. Cl.
CPC ............. *B25J 9/1602* (2013.01); *B25J 9/065* (2013.01); *B25J 9/163* (2013.01); *B25J 9/1689* (2013.01);
(Continued)

(58) Field of Classification Search
CPC . B25J 9/1602; B25J 9/065; B25J 9/163; B25J 9/1689; B25J 13/08; B25J 9/00;
(Continued)

(56) References Cited

U.S. PATENT DOCUMENTS 5,337,732 A * 8/1994 Grundfest ............... A61B 34/30
600/116
7,662,091 B2 2/2010 Bagley et al.
(Continued)

FOREIGN PATENT DOCUMENTS

CN 107139176 9/2017
CN 113843786 12/2021
(Continued)

OTHER PUBLICATIONS

Liu, Rongrong, et al.; "Deep Reinforcement Learning for the Control of Robotic Manipulation: A Focussed Mini-Review"; ICube Lab Robotics Department Strasbourg University UMR 7357 CNRS, Robotics 2021, 1, 0, 12 pgs.
(Continued)

*Primary Examiner* — Adam R Mott
*Assistant Examiner* — Byron Xavier Kasper
(74) *Attorney, Agent, or Firm* — Fitch, Even, Tabin & Flannery, LLP

(57) ABSTRACT

A robotic arm is inserted into a passage of a part to be examined. Operator instructions defining a tip motion for a tip of the robotic arm, sensor readings, and an environmental map are received. The operator instructions, the environmental map and sensor readings are applied to a previously trained machine learning model to produce control signals. The control signals to an actuator on the arm to control a movement of the robotic arm allowing the robotic arm to automatically gain traction in the passage and automatically move according to the movement.

20 Claims, 10 Drawing Sheets

(51) Int. Cl.
*B25J 13/08* (2006.01)
*G05D 1/00* (2006.01)

(52) U.S. Cl.
CPC ............ *B25J 13/08* (2013.01); *G05D 1/0274* (2013.01); *G05B 2219/35012* (2013.01); *G05B 2219/39001* (2013.01)

(58) Field of Classification Search
CPC ........ B25J 9/16; B25J 9/06; B25J 9/10; B25J 9/106; B25J 9/12; B25J 9/1635; B25J 9/1633; B25J 9/1656; B25J 9/1664; B25J 9/1671; B25J 9/1674; B25J 9/1697; B25J 18/06; G05D 1/0274; G05B 2219/35012; G05B 2219/39001; G05B 23/00; G05B 23/02; A61B 34/00; A61B 34/10; A61B 34/20; A61B 2034/2065; A61B 34/30; A61B 2034/301; A61B 2034/302; A61B 34/32; A61B 34/35; A61B 34/70; A61B 34/74; A61B 2034/742; A61B 1/00057; A61B 1/00156

See application file for complete search history.

(56) References Cited

U.S. PATENT DOCUMENTS

| | | | |
|---|---|---|---|
| 10,488,349 B2 | 11/2019 | Sibbach | |
| 11,154,179 B2 | 10/2021 | Kashima et al. | |
| 2007/0038230 A1* | 2/2007 | Stone | A61B 17/0485 606/139 |
| 2011/0295426 A1 | 12/2011 | Georgeson | |
| 2018/0296281 A1* | 10/2018 | Yeung | A61B 34/32 |
| 2018/0371914 A1* | 12/2018 | Karigiannis | F01D 5/005 |
| 2019/0335981 A1* | 11/2019 | Hane | A61B 1/0011 |
| 2021/0114826 A1* | 4/2021 | Simon | B65G 61/00 |
| 2021/0213612 A1 | 7/2021 | Onodera | |

FOREIGN PATENT DOCUMENTS

| | | | | |
|---|---|---|---|---|
| EP | 3461747 A1 | 4/2019 | | |
| GB | 2571528 A * | 9/2019 | ............ | B25J 13/089 |
| WO | 9811816 A1 | 3/1998 | | |
| WO | 2018183709 A1 | 10/2018 | | |
| WO | 202096892 A1 | 5/2020 | | |
| WO | 202135094 A1 | 2/2021 | | |

OTHER PUBLICATIONS

Alexander H Chang et al: "Autonomous, Monocular, Vision-Based Snake Robot Navigation and Traversal of Cluttered Environments using Rectilinear Gait Motion", arxiv.org, Cornell University Library, 201 Olin Library Cornell University Ithaca, NY 14853, Aug. 20, 2019 (Aug. 20, 2019), XP081465841.

Sanfilippo Filippo et al: "A review on perception-driven obstacle-aided locomotion for snake robots", 2016 14th International Conference on Control, Automation, Robotics and Vision (ICARCV), IEEE, Nov. 13, 2016 (Nov. 13, 2016), pp. XP033054308, DOI: 10.1109/ICARCV.2016.7838565.

Yilang Liu et al: "An Energy-Saving Snake 1-15 Locomotion Gait Policy Using Deep Reinforcement Learning", arxiv.org, Cornell University Library, 201 Olin Library Cornell University Ithaca, NY 14853, Mar. 8, 2021 (Mar. 8, 2021), XP081907354.

* cited by examiner

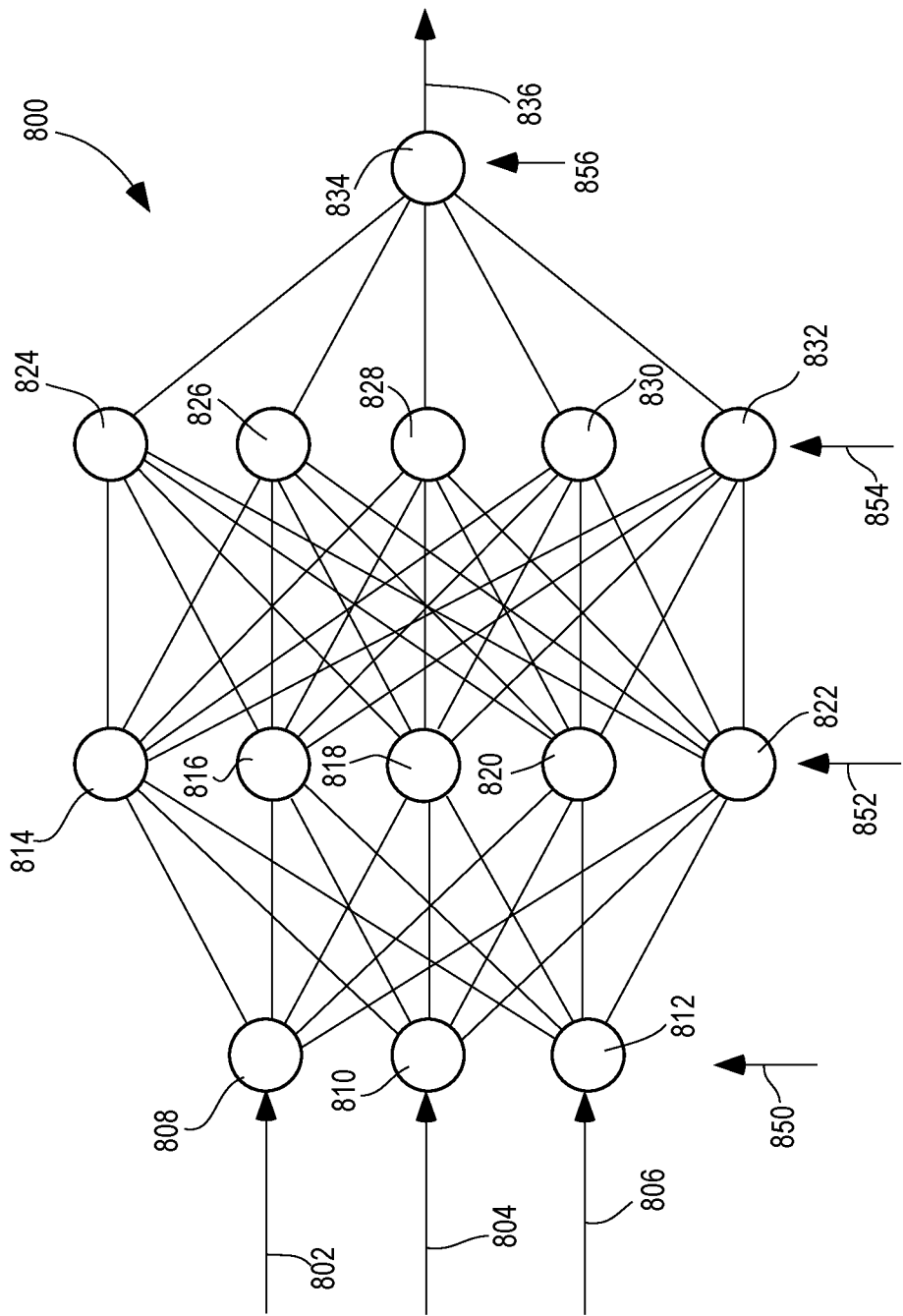

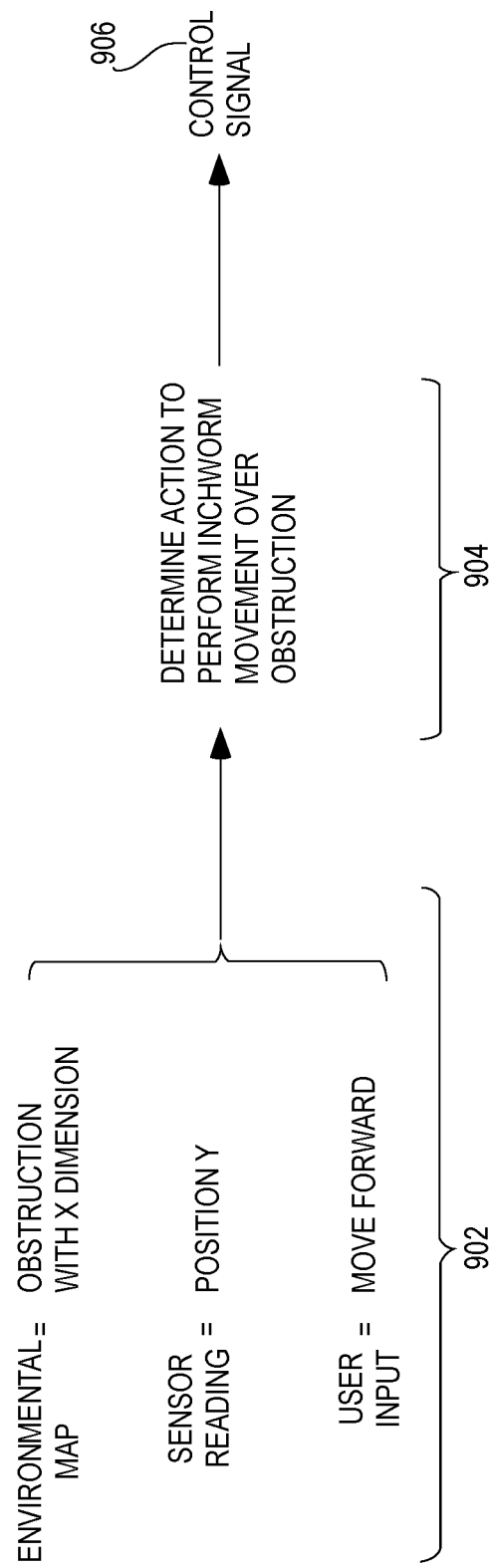

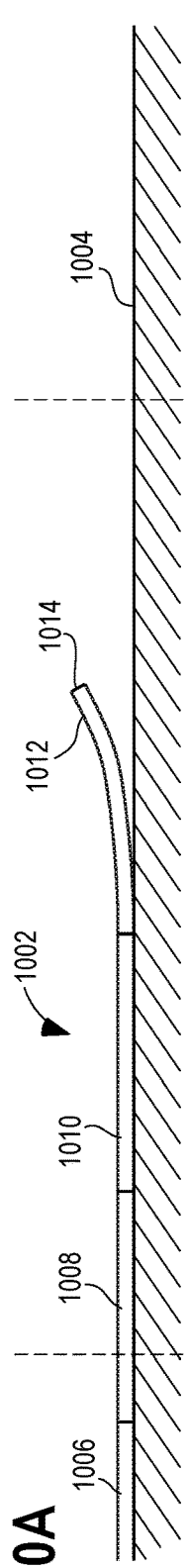
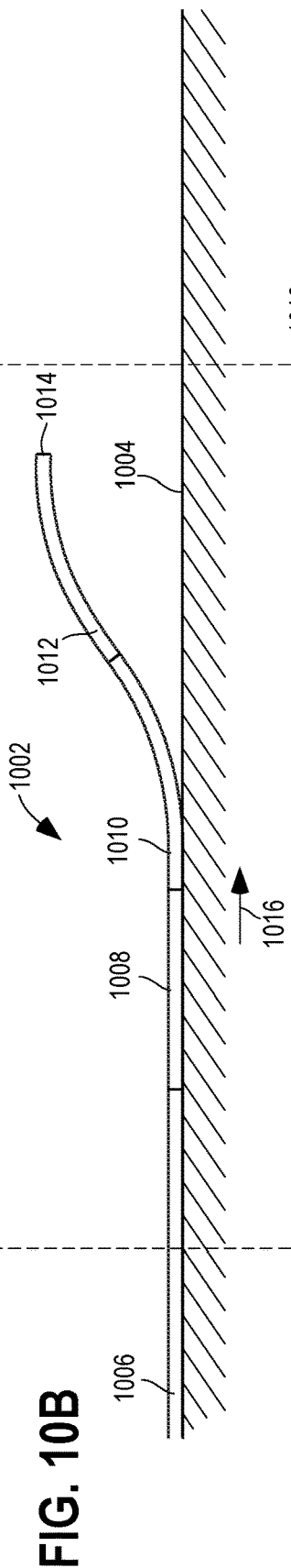
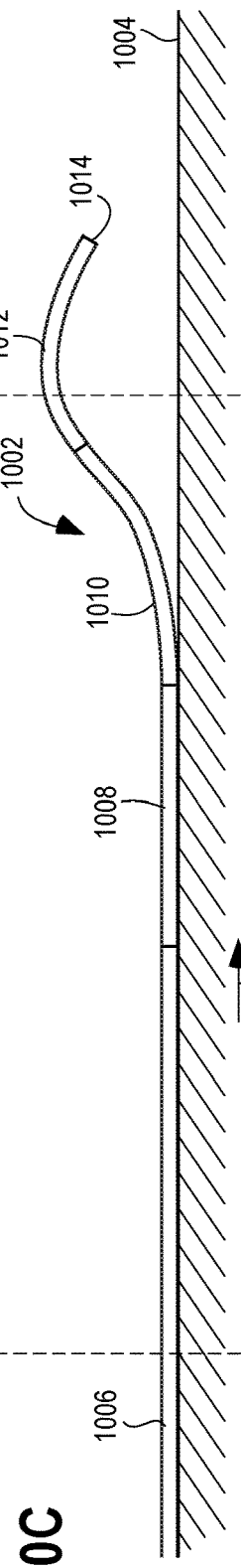
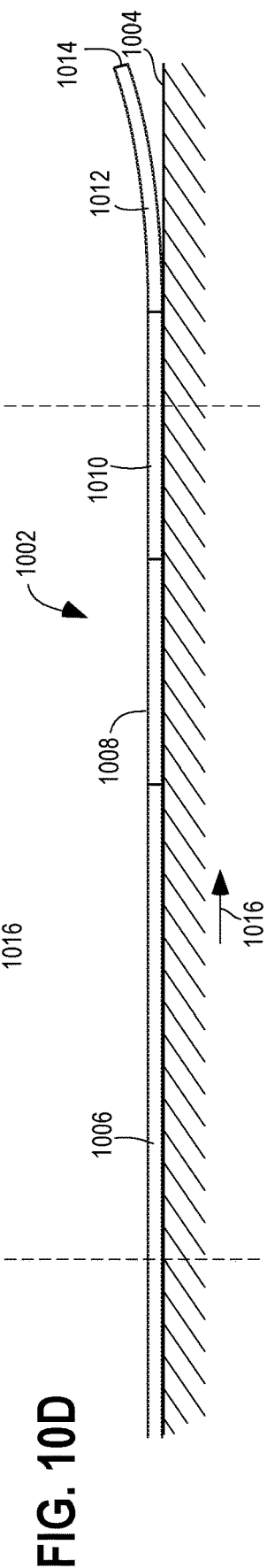

METHOD AND APPARATUS FOR ROBOTIC ARM NAVIGATION

TECHNICAL FIELD

These teachings relate generally to robotic arm navigation within parts that are to be examined, inspected, worked upon, or maintained.

BACKGROUND

Snake-like robotic arms are longitudinally extended robotic devices with many degrees of freedom that may be inserted into various environments for the purpose of performing inspections, maintenance, or repairs. These arms often include a large number of controlled joints, coupled to cameras or other sensors that are inserted into parts to be inspected.

For example, a snake-like robotic arm can be inserted into an engine to inspect the internal components of the engine. The large number of degrees of freedom of these devices allows them to be inserted into cluttered, confined, and/or otherwise non-accessible parts of the engine. The images and other information obtained by the camera can be analyzed for signs of damage, wear, or other issues, while repair and maintenance activity may extend the serviceable or useful life of the parts.

BRIEF DESCRIPTION OF THE DRAWINGS

Various needs are at least partially met through provision of the method and apparatus for the navigation of a robotic arm described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which:

FIG. 8 comprises a diagram as configured in accordance with various embodiments of these teachings;

FIG. 9 comprises a diagram as configured in accordance with various embodiments of these teachings; and FIGS. 10A, 10B, 10C, and 10D comprise diagrams as configured in accordance with various embodiments of these teachings.

Figure 1A:
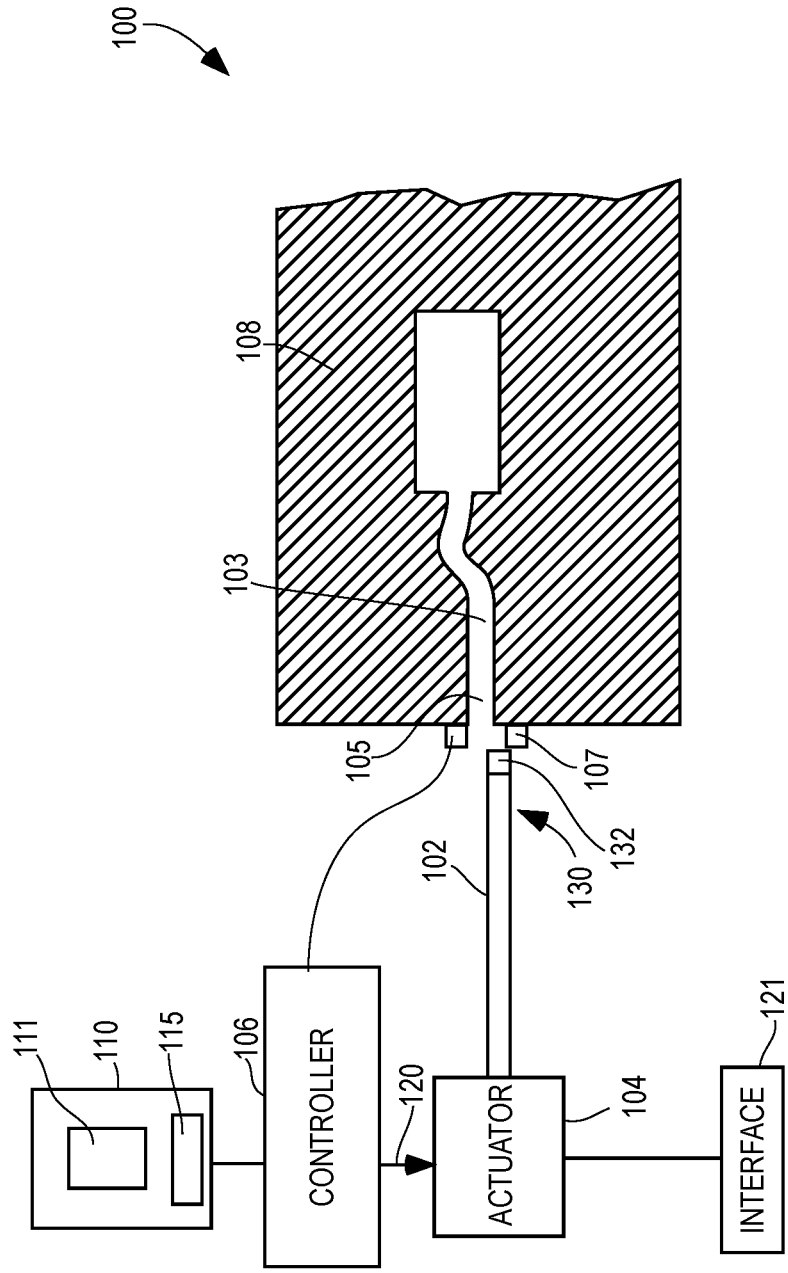
FIG. 1A comprises a diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

The approaches described herein provide extended, under-constrained robotic snake arm devices with multiple degrees of freedom to be used by non-expert operators or inspectors, to navigate complex spaces such the interiors of gas turbine engines. The operators or inspectors do not need special expertise in utilizing these devices. At the same time, these approaches maximize the utility provided by the additional degrees of freedom of the snake-like robotic arm to follow complex paths and to adopt complex inspection poses (e.g., "striking cobra" lifts or positions).

Additionally, the approaches provided herein maximize navigation capability through cluttered environments via self-propulsion of the robotic arm in a variety of different traction modes such as inchworm mode, sidewinding mode, and corkscrewing mode at the tip of the snake-arm robot, to overcome the limitations associated with pushing endoscopes from the base, into areas with insufficient constraints to support the desired pathway for the robot or through paths limited by friction and/or reaction forces.

The navigation of the snake arm robots is further enhanced in cases where computer aided design (CAD) models, machine learning models, or other models of the part to be examined exist, by the use of mission or task-based cost functions to control the shape of the robotic arm to maximize reach and navigation capability given the known ultimate destination and/or goal of the robotic arm or its tip.

In aspects, the present approaches provide a flexible snake-like robot arm, which has multiple controllable degrees of freedom but which is too slender and flexible to be self-supporting. The flexibility and additional control provide the ability to reach into more complex and cluttered spaces than other devices, since they are flexible and can tolerate contact with the environment, and have more support than, for instance, a borescope, enabling them to span gaps and be self-supporting over short lengths.

In other aspects, the approaches provided herein enable a flexible snake-like robot arm to employ some or all of its control degrees of freedom to pull the device into a cluttered environment from the distal (tip) end, so that low bending stiffness along the length of the device ceases to be a limiting factor for length of insertion into a cluttered environment. The present approach also advantageously provides a user-friendly means of controlling such a device to follow a path, re-position the viewpoint with respect to supporting surfaces, and use sophisticated motion to advance, without the need for operator awareness or direct control to enable it.

In many of these embodiments, a system comprises a robotic arm, at least one sensor, an actuator, and a controller. The robotic arm is flexible and is inserted into a passage within a part. The robotic arm has multiple degrees of freedom as it moves through the passage. The actuator is coupled to the robotic arm.

The least one controller may be coupled to the robotic arm, the at least one sensor, and the actuator. The controller is configured to receive operator instructions defining a tip motion for the tip of the robotic arm; receive sensor readings from the at least one sensor; access an environmental map, the environmental map defining a geometry of portions of the passage; apply the operator instructions, the environmental map and sensor readings to a previously trained machine learning model to produce control signals; and apply the control signals to the actuator on the robotic arm to control a movement of the robotic arm allowing the robotic arm to automatically gain traction in the passage and automatically self-propel or move according to the movement. By "traction" and as used herein it is meant support or resistance against relative motion between two objects (e.g., the robotic arm and a passage). For example, traction is provided between the robotic arm and a surface of the passage to propel the robotic arm forward. In another example, traction is provided between the robotic arm and a surface to support the arm against gravity and/or prevent the arm from moving due to gravity.

In aspects, the environmental map comprises a computer aided design (CAD) model. In other examples, the environmental map comprises a dynamically changing model. In still other examples, the environmental map comprises a hybrid of a CAD model and a dynamically changing model.

In examples, the at least one sensor comprises a camera. Other examples of sensors are possible including without limitation light detection and ranging (Lidar), stereo cameras, ultrasound sensors, and touch whisker sensors to mention a few examples.

In other examples, the robotic arm is inserted into the passage at an insertion point of the part. The at least one sensor comprises a position sensor positioned at the insertion point, the position sensor determining positions of the robotic arm based upon detecting markings on the robotic arm. In further examples, the at least one sensor comprises a camera sensor positioned to view the insertion point and the arm simultaneously, the camera monitoring motion of the robotic arm based upon detecting markings on the robotic arm relative to datums comprising the insertion point, or specialized markings such as QR codes or AprilTags.

Various movements of the robotic arm (or portions of the robotic arm such as the tip) are possible. For example, the movement may be a sidewinding movement, a corkscrew movement, or an inchworm movement. Other examples are possible.

In other aspects, the actuator comprises or is coupled to a user interface that is configured to receive the operator instructions from an operator.

In others of these embodiments, a robotic arm is inserted into a passage within a part. The robotic arm is flexible and has multiple degrees of freedom as it moves through the passage. At a controller: operator instructions defining a tip motion for a tip of the robotic arm are received; sensor readings from at least one sensor are received; an environmental map is accessed, the environmental map defining a geometry of portions of the passage; the operator instructions, the environmental map and sensor readings are applied to a previously trained machine learning model to produce control signals; and the control signals are applied to an actuator on the robotic arm to control a movement of the robotic arm allowing the robotic arm to automatically gain traction in the passage and automatically self-propel or move according to the movement.

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

The foregoing and other benefits may become clearer upon making a thorough review and study of the following detailed description.

Figure 1B:
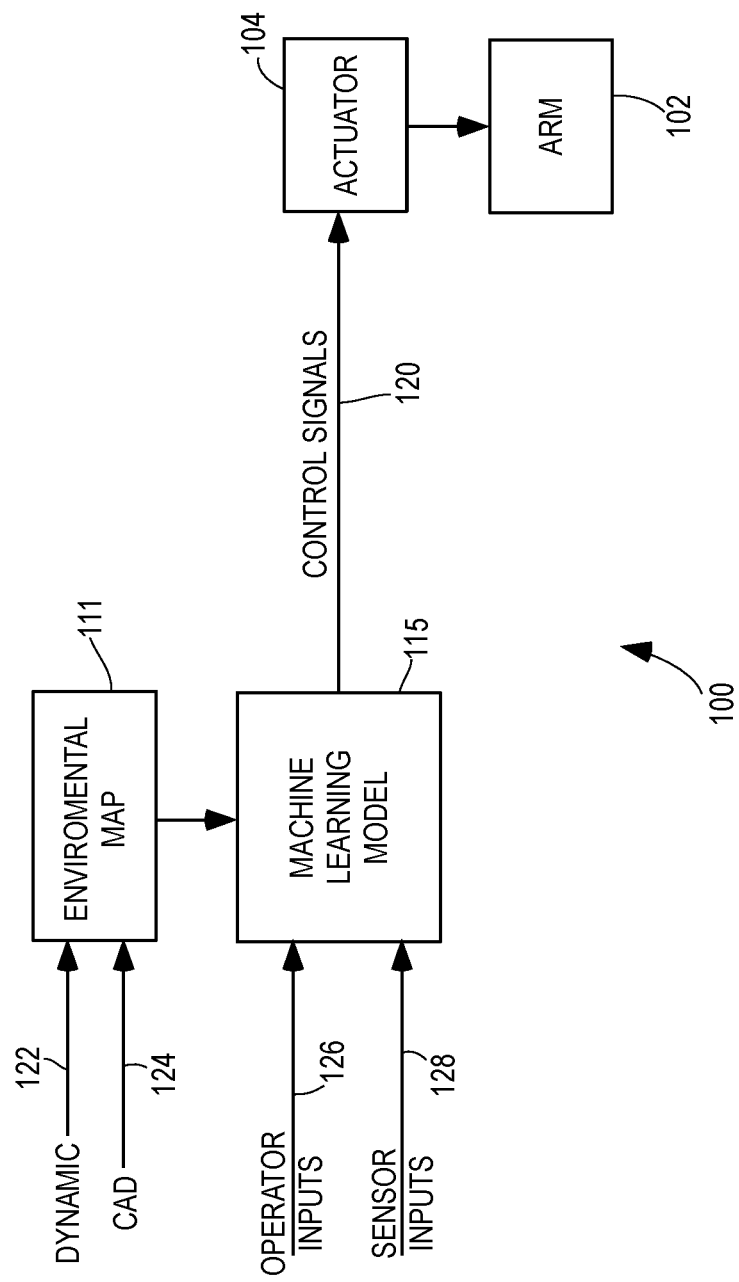
FIG. 1B comprises a diagram as configured in accordance with various embodiments of these teachings.

Referring now to FIG. 1A and FIG. 1B, one example of a system 100 for controlling the movement of a robotic arm 102 in a part to be tested is described. The system 100 includes the robotic arm 102, an actuator 104, and a controller 106. It will be appreciated that the approaches used can be used for insertion of the robotic arm 102 into a passage 103. However, the approaches can also be used to control movement of the robotic arm 102 out of the passage 103 (once it has been inserted) in a direction generally opposite of the direction of insertion. This is a significant advantage over previous approaches, which relied on a manual extraction (e.g., pulling) of a device from the passage.

The robotic arm 102 is flexible and is inserted into the passage 103 within a part 108 (to be examined, inspected, worked upon, maintained, or machined) at an insertion point (or opening) 105. The robotic arm 102 has multiple degrees of freedom as it moves through the passage 103.

The robotic arm 102 may include a tip portion 130 (or work head) adapted to carry a sensor 132 (or tool or other examination element) for work, examination, or inspection of the passage 103, and an extended support arm 102 or structure supporting the tip portion 130. The support arm 102 comprises at least one segment having a plurality of links, each link being articulated with respect to its neighbor and devices or control elements configured to control the position and/or attitude of the segment relative to a datum thereby enabling the arm to follow and adapt to a predetermined path or shape.

Robotic arms of this type are frequently referred to as "snake arms", since they have the ability to advance longitudinally along their own length thus enabling them to follow a serpentine path. This has the advantage that arms of this type may be used in circumstances where access to a work site is severely restricted. However, snake-arm robots can also move in other modes than advancing longitudinally along a path, for example, by changing the attitude and position of the arm 102 without moving the base driving the arm to cause the arm 102 to move along a path.

In aspects, control of the robotic arm 102 is made with a multiplicity of tendons such as ropes or, more specifically, wire ropes or cables, each rope connected at one point within the plurality of links of the arm at one end of the rope and connected to the actuator 104, which is configured to apply a force and displacement at the other end of the rope. The actuator 104 is coupled to and controls movement of these structures and thus movement and shape of the robotic arm 102. In aspects, overlapping Bowden-cable actuation is provided to enable wave-like motion. Wave-like motion can be achieved without Bowden-cable construction, as well.

A position sensor 107 is disposed at the insertion point 105 and coupled to the controller 106. The position sensor 107 is configured to determine a position of the robotic arm 102. For example, detection of a particular marking on the robotic arm 102 as it passes the position sensor 107 allows the controller 106 to know how much of the robotic arm 102 is within the part 108. The motion of the marking on the arm 102 may also allow the twist rotation of the arm 102 around its axis to be determined. If the amount of robotic arm 102 within the part 108 is known, the position of the robotic arm 102 (and its tip) is known (or at least generally known). In examples, the position sensor 107 may be a camera that obtains visual images, which are processed by the controller 106. Alternatively, the position sensor 107 may be a sensor positioned away from both the robotic arm 102 and the passage 103 and positioned to be capable of observing the part of the robotic arm 102, which is external to the passage 103 and simultaneously the entry to the passage 103, so that the length of the robotic arm 102 which is inserted into the passage 103 can be derived from visual observation. In aspects, feedback from the position sensor 107 is utilized to obtain corkscrew motion.

The actuator 104 may be a motor or other device that pushes the robotic arm 102 and also actuates the wire ropes or cables of the robotic arm 102. In some cases, the robotic arm 102 is pushed by a person (e.g., initially inserting the robotic arm 102 into the part 108).

In some other examples, the actuator 104 obtains instructions defining a goal (e.g., a destination within the passage) for the tip portion 130 of the robotic arm 102. In these regards, the actuator 104 may include a user interface 121 to allow an operator to enter commands that specify the destination. For example, the user interface 121 may comprise a joystick. In another example, the ultimate destination is unknown at the start of the operation, and the operator may use the user interface 121 to steer the robotic arm 102 interactively in an exploratory mode. Other examples of operator input are possible.

An environmental map 111 (e.g., a computer aided design (CAD) model or a dynamically generated map) is stored in a memory 110. The memory 110 may be any type of electronic storage device. The environmental map 111 includes information concerning information about the passage 103 and the part 108. For example, the environmental map 111 specifies the shape, dimensions, relative location, and/or relative position of the passage 103, obstructions in the passage 103, and the shape, dimensions, relative location, and/or relative position of internal components of the part 108. For example, if the part 108 is an aircraft engine, the position, the shape, dimensions, relative location, and/or relative position of passages, blades, vanes, and rotors of the engine may be included in the environmental map 111.

The controller 106 is coupled to the robotic arm 102 (and the sensor 132), the position sensor 107 and the actuator 104. In some aspects, the controller 106 is disposed at or within the actuator 104. It will be appreciated that as used herein the term "controller" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The controller 106 may be configured (for example, by using corresponding programming stored in a memory as will be well understood by those skilled in the art) to carry out one or more of the steps, actions, and/or functions described herein.

The memory 110 also stores the machine learning model 115. Examples of machine learning models include neural networks and other such structures. If the machine learning model 115 is a neural network, the neural network may be trained. In examples, training can include seeding or incorporating movements into the neural network. For example, the sidewinder movement, corkscrew movement, and inchworm movements may be incorporated into the neural network. In another example, the machine learning model 115 is trained by having the robotic arm traverse passages in a part (e.g., a part used for training or testing) so that the machine learning model learns certain behaviors (e.g., on encountering an obstacle, a certain action is performed).

The machine learning model 115 may be trained in a supervised or unsupervised way. Supervised algorithms select target or desired results, which are predicted from a given set of predictors (independent variables). Using this set of variables, a function or structure is generated that maps inputs to desired outputs. The training process continues until the machine learning model 115 achieves a desired level of accuracy on the training data. Examples of supervised learning algorithms include regression, decision tree, random forest, k-nearest neighbors (KNN), and logistic regression approaches. In aspects, supervised learning can use labeled data. The desired outputs include desired control signals to achieve desired results in one example.

In unsupervised learning, no targets are used. Instead, these approaches cluster populations into different groups according to patterns. Examples of unsupervised learning approaches include the Apriori algorithm and the K-means approach.

In one example of the operation of the system of FIG. 1A, the controller 106 is configured to: receive the instructions (e.g., operator inputs 126) and access the environmental map 111 from the memory 110. Based upon the instructions and the environmental map 111, the controller 106 applies these to the machine learning model 115 to obtain one or more control signals 120. The one or more control signals 120 are applied to the actuator 104 to change a configuration state of the robotic arm 102 using the multiple degrees of freedom allowing the robotic arm to gain traction in the passage 103 and self-propel towards the destination according to a movement without an involvement of the actuator 104. As mentioned, these changes of state may be implemented by the actuator 104.

The changes in shape of the robotic arm 102 allow it to gain traction in the passage 103 and self-propel through the passage 103. For example, an inchworm type motion made by the robotic arm 102 causes portions of the robotic arm 102 to grip and push the bottom of the passage 103, thereby propelling all portions of the robotic arm 102 forward. Obstacles in the passage 103 can be used as leverage for the robotic arm 102 to encourage and foster the self-propelled movement of the robotic arm 102. In so doing, it can be seen that operator intervention is not required once an operator inserts the robotic arm 102 in the part 108. It will also be appreciated that although the approaches described herein allow the robotic arm 102 to self-propel through at least some parts of the passage 103, the actuator 104 can provide additional force or power to move the robotic arm 102 through the passage 103. It will also be appreciated that movements created are not limited to the specific movements mentioned herein (e.g., sidewinder, corkscrew, or inchworm) but may be combinations or variations of these movements in addition other entirely different movements.

In some cases, the actuator 104 does not push the robotic arm 102. Instead, a person pushes (and potentially twists) the robotic arm 102 and the position sensor 107 measures the displacement of the robotic arm 102 and sees the sensed displacement as control inputs.

In aspects, robotic arm includes a distal end (including the tip portion 130) and a proximal end (opposite the distal end). The tip portion 130 (including the tip) of the robotic arm 102 is controlled so as not to have to be in contact with support from the environment (the passage 103). Using multiple degrees of freedom of the robotic arm 102, most of the distal environmental support for a distal end of the robotic arm 102 (that includes the tip portion 130) may be provided by the passage 103 towards the proximal end of the robotic arm 102. For example, support for the robotic arm 102 may be at the second or third segment of the robotic arm 102 behind the tip portion 130. In operation, an operator would be unaware of the fact that the machine learning model 115 is controlling more of the robotic arm 102 to enable the tip portion 130 (including the tip) to be lifted further away from any supporting surface in the passage 103. In one example, the tip portion 130 includes the first two segments of the robotic arm 130 at the distal end.

Referring now to FIG. 1B, the operation of the system 100 is further described. Dynamic map generation approaches 122 or CAD approaches 124 can be used to create the environmental map 111. In addition, a hybrid of these two approaches can be utilized.

The CAD approaches 124 may include the use of a CAD file describing the part 108 (e.g., passage 103) by the environmental map 111. The CAD file may be in any appropriate format.

The dynamic map generation approaches 122 may operate according to a simultaneous localization and mapping (SLAM) approach. SLAM approaches construct the environmental map of the part 108 (e.g., an aircraft engine) by using, for example, sensor inputs (e.g., the sensor 132) as the robotic arm 102 moves through the part 108 (e.g., through the passage 103). The environmental map 111 created by the SLAM approach (or other dynamic approaches) is dynamically changing over time. For example, the environmental map 111 may include very little information initially and then is populated with more detailed information over time. Using such dynamic approaches is effective to tailor the environmental map 111 to the part 108 (i.e., the specific part, not merely a part of a given type). For instance, if the part 108 is an aircraft engine, blades in aircraft engine A may be unbent from a nominal shape, but blades in aircraft engine B may be bent from the nominal shape. Additionally, the blades of engine A may be unbent at a first time but bent at a subsequent time. In these examples, separate environmental maps are constructed for engine A and engine B, and separate environmental maps constructed for engine A at the first time and at the second time.

The environmental map 111, operator inputs 126 (e.g., joystick positions), and sensor inputs 128 (e.g., readings from the position sensor 107) are applied to the machine learning model 115 to produce the one or more control signals 120. The one or more control signals 120 are applied to the actuator 104. The actuator 104 uses these to control the robotic arm 102. In so doing, movement of the robotic arm 102 is controlled allowing the robotic arm 102 to automatically gain traction in the passage 103 and automatically self-propel according to a movement.

To take one example, as the robotic arm 102 traverses through the passage 103, and obstruction may be encountered within the passage 103. The environmental map 111, operator inputs 126 (e.g., joystick positions), and sensor inputs 128 (e.g., readings from the position sensor 107) are applied to the machine learning model 115. The machine learning model 115 determines that an inchworm movement will allow the robotic arm 102 to surmount the obstructions. The control signals 120 causing this movement are sent to the actuator 104, which causes the robotic arm 102 (or portions of the robotic arm) to perform this prescribed movement. The operator is only aware that the robotic arm 102 is moving forward and need not be diverted to deal with the obstruction. In other words, surmounting the obstruction is automatically handled by the system 100.

Figure 2:
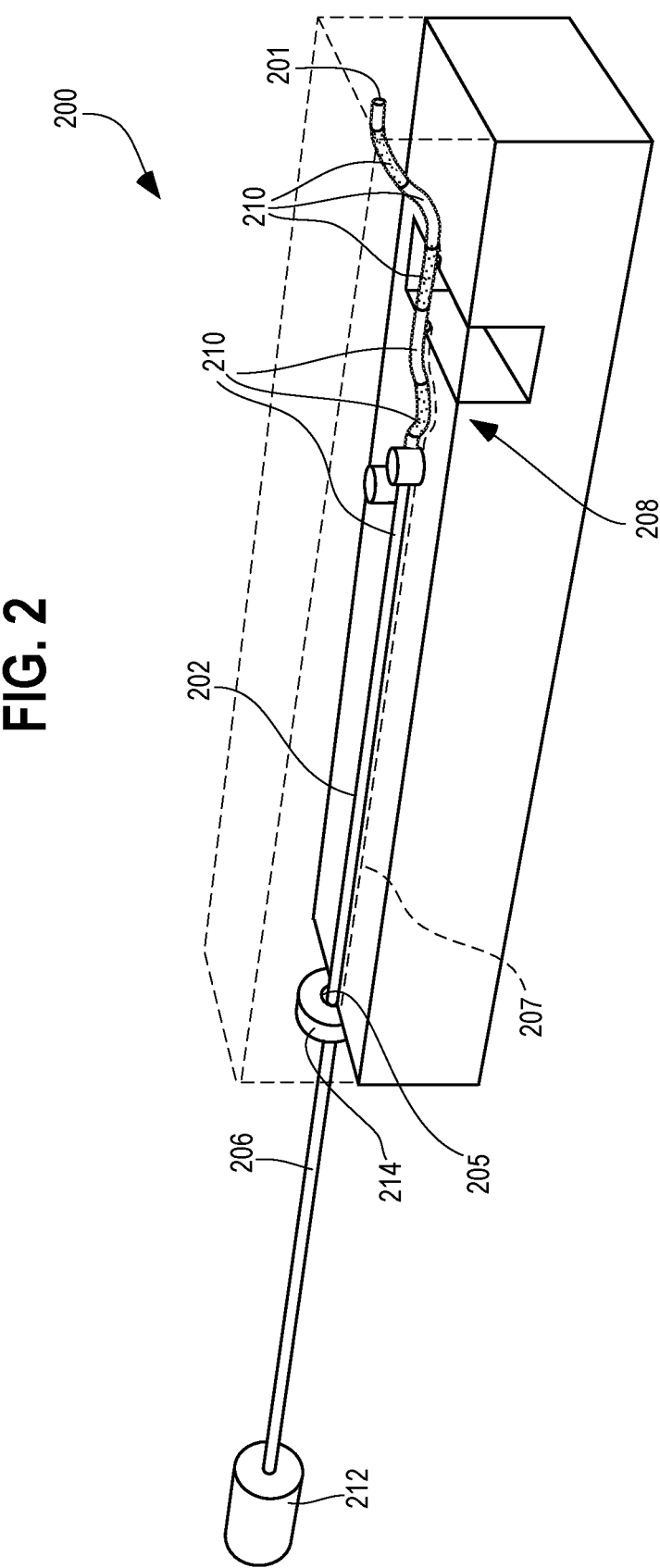
FIG. 2 comprises a diagram as configured in accordance with various embodiments of these teachings.

Referring now to FIG. 2, one example of a system 200 for navigating a robotic arm 202 with a tip 201 in a part to be inspected 204 is described. The tip 201 may include a first sensor (e.g., a camera, not shown, see sensor 132 in FIG. 1A).

The robotic arm 202 includes a first section 206, which is a passive arm section for manual manipulation and a second section 208 that includes multiple actuated segments 210. In examples, a human may push the robotic arm 202. An actuator pack 212 includes motors, gears and other mechanisms to push the robotic arm 202 and control movement of the robotic arm 202. The robotic arm 202 may include ropes, wires, cables, gears, pulleys, or the mechanism that when adjusted by the actuator pack 212 in certain ways causes the robotic arm 202 to self-propel and make this movement take on various shapes such as the sidewinder motion, the corkscrew motion, or the inchworm motion to mention a few examples. The actuator pack 212 may also include the controller (e.g., controller 106) that performs the various operations described herein. As mentioned elsewhere herein, deep reinforcement learning may be used to obtain a machine learning model 115. The machine learning model 115 is seeded or trained with these behaviors as a starting point.

The part to be inspected 204 includes a borescope inspection (BSI) port 205 allowing entry into a passage 207 in the part to be inspected 204. For clarity, the top half of the part to be inspected 204 has been removed so as to see portions of the robotic arm 202 in the part to be inspected 204. The part to be inspected 204 may an aircraft engine and the passage 207 may be inside the engine.

In aspects, a second (or location) sensor 214 is installed on or about the BSI port 205. The robotic arm 202 is initially passive, until the tip 201 is sensed as it passes through the location sensor 214 upon insertion by an operator. The second sensor 214 uses markings on the exterior of the robotic arm 202 to sense position (e.g., depth of insertion into the passage 207) and rotation of the robotic arm 202 as it's manually inserted. Snake-like motion is slaved to the insertion sensing and actuator motion is similarly slaved to the insertion sensing to maintain the passive section 206 of the robotic arm 202 in a manipulable condition instead of pushing or pulling. Other types of sensors could also be used. For example, magnetic properties may be encoded onto the skin of the robotic arm 202 and the second sensor 214 may be a Hall effect sensor that senses these properties.

In other aspects, the second sensor 214 houses a stabilizing grip element. The stabilizing grip element (such as a clip or gripper) can hold the robotic arm 202 motionless when the operator needs the arm to be held motionless, to enable single-handed operation. The intent is sensed through the arm skin, by visual gesture sensing, or when explicitly instructed by a switch e.g., a foot pedal switch. In other embodiments, the stabilizing grip element may be separate from or adjacent to the second sensor 214.

Control of the robotic arm 202 may be accomplished by operators by using manual insertion. In this case, the operator inserts the robotic arm 202 as they would a borescope and controls the direction of motion or tip articulation (e.g., up/down/left/right) with a joystick (e.g., user interface 121). The operator may steer the tip 201 using an image obtained from a camera (e.g., see sensor 132) mounted at the tip 201. Although the camera image can be software-rotated for display, twisting the robotic arm 202 is typically familiar to the operator, so arm twist of the robotic arm 202 is sensed by the second sensor 214 and enabled as a use mode. In some embodiments, the camera image may be software rotated so that the vertical axis of the image is aligned to the gravity vector, while in other embodiments the camera image is not rotated, so that arm twist of the robotic arm 202 results in image rotation.

In yet other aspects, the first sensor (e.g., sensor 132) at the tip 201 is used to identify features in the insertion environment in real time to generate an environment model which is used for support, stabilization, gap bridging, arm constraint, and limits evaluation. The operator concentrates only on tip motion based on visual (e.g., camera) feedback, while the control software uses the multiple degrees of freedom in the arm to achieve forward motion with stability and the desired tip position, and traction motion where possible.

In some instances, a CAD model is available for the environment (e.g., passage 207), and task-based cost functions may be defined to enable navigation assistance. These task-based cost functions help bias the arm shape of robotic arm 202 in an optimal manner, given the ultimate objective, without constraining the operator interaction. Typical cost functions may include the sum of the magnitude of bend angles between degrees of freedom of the arm, as an overall measure of arm articulation of robotic arm 202, or the sum of the squares of the bend angles, so as to minimise extremes of bend angles between degrees of freedom of the robotic arm 202.

Figure 3:
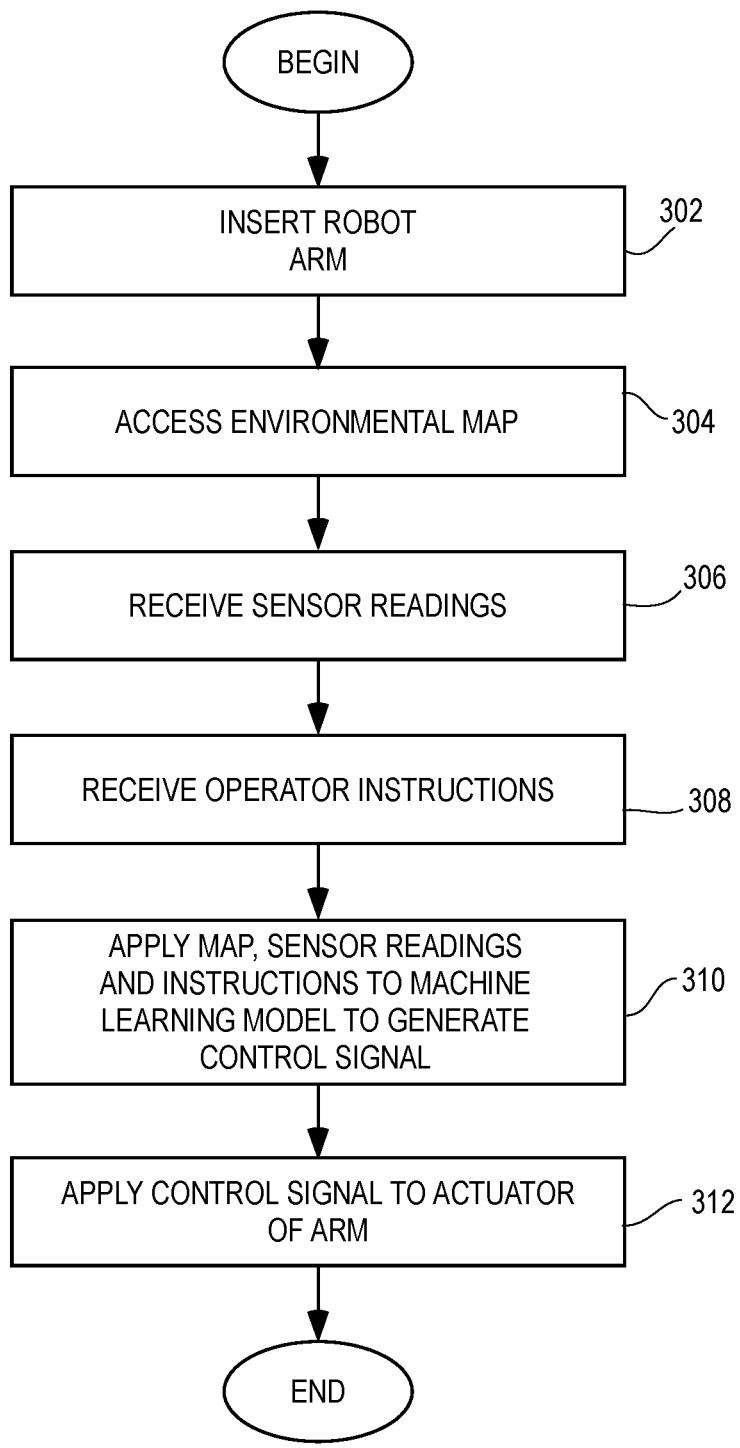
FIG. 3 comprises a flowchart as configured in accordance with various embodiments of these teachings.

Referring now to FIG. 3, one example of an approach for controlling a robotic arm is described.

At step 302, a robotic arm is inserted into a passage of a part to be examined. The robotic arm is flexible and comprises a tip with a sensor at the tip. The robotic arm has multiple degrees of freedom as it moves through the passage.

At step 304, an environmental map is accessed. The environmental map may be stored in an electronic memory. The environmental map may be static (e.g., a CAD model) or dynamically changing (e.g., generated and updated using SLAM approaches).

At step 306, sensor readings are received. These may be from the tip of the robotic arm. In other aspects, these readings may be from the sensor at the input port.

At step 308, user instructions are received. These user instructions may be from a joystick. Other examples are possible.

At step 310, the environmental map, sensor readings, and user instructions are applied to a machine learning model to produce control signals. As discussed elsewhere herein, the machine learning model may be any type of machine learning model such as a neural network.

At step 312, the control signals are applied to an actuator of the arm or the robotic arm to move the robotic arm.

Figure 4:
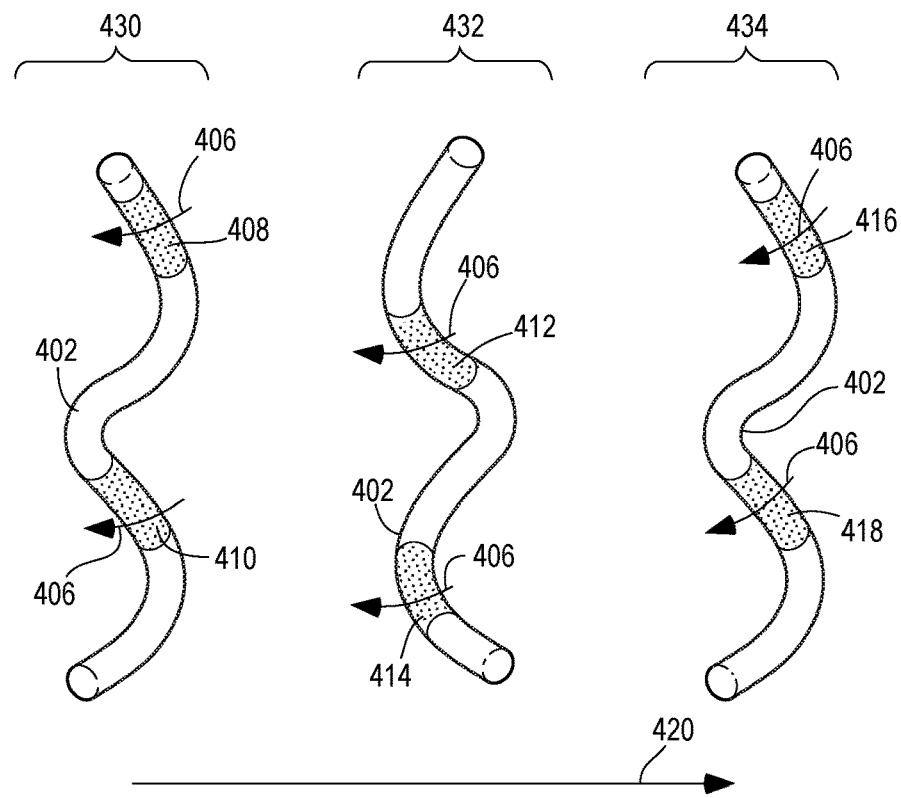
FIG. 4 comprises a diagram as configured in accordance with various embodiments of these teachings.
Figure 5:
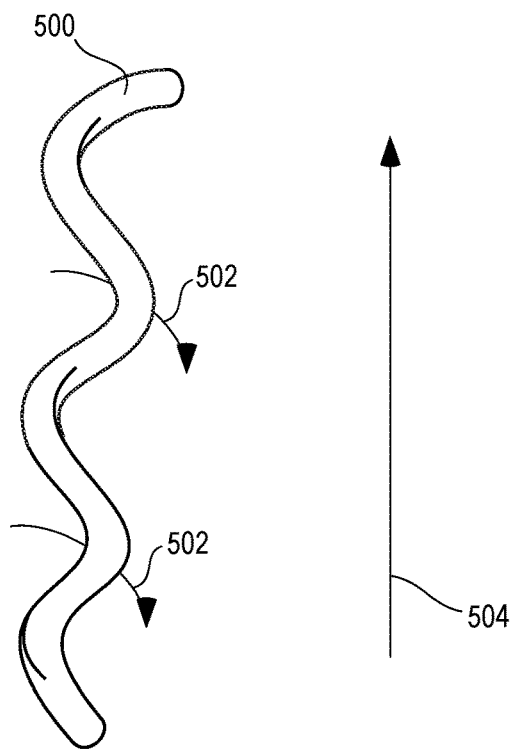
FIG. 5 comprises a diagram as configured in accordance with various embodiments of these teachings.
Figure 6:
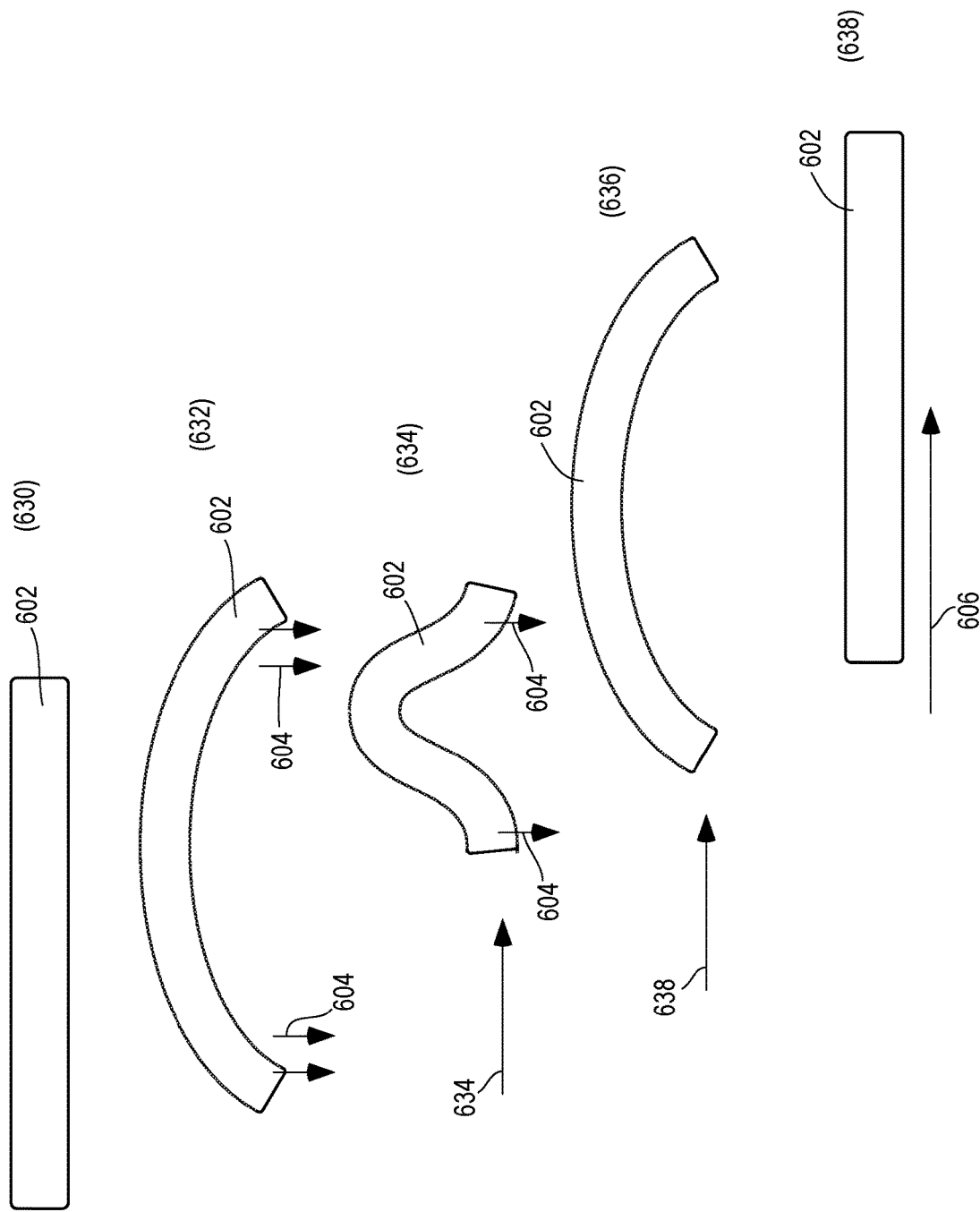
FIG. 6 comprises a diagram as configured in accordance with various embodiments of these teachings.

Referring now to FIG. 4, FIG. 5, and FIG. 6, examples of the complex motions provided by the present approaches are described. It will be appreciated that these motions may cause all or portions of the arm (e.g., the portions of the arm around or behind the tip) to move. Further, combinations of these motions are possible. Still further, other complex motions are possible.

Referring now to FIG. 4, one example of a robotic arm 402 (or portions of a robotic arm 402) that moves in a sidewinder type movement is described. FIG. 4 shows the movement of the robotic arm 402 generally moving in the direction indicated by the arrow labelled 420. As shown, sections of the robotic arm 402 are actuated to push the robotic arm 402. These sections push against objects (e.g., sides of a passage, obstructions, internal elements of a part that is being inspected). The act of pushing by certain sections of the robotic arm 402 moves the entire robotic arm 402 in the direction indicated by the arrow labelled 420 and causes the robotic arm 402 to assume the sidewinder shape.

More specifically, the robotic arm 402 is first shaped in a shape 430. Sections 408 and 410 are actuated to push the robotic arm 402 in the direction indicated by the arrows labelled 406, which moves the robotic arm 402 and results in the robotic arm 402 assuming a shape 432. Sections 412 and 414 are then actuated to push the robotic arm 402 in the direction indicated by the arrows labelled 406, which moves the robotic arm 402 and results in the robotic arm 402 assuming a shape 434. Once the robotic arm 402 is in shape 434, sections 416 and 418 can push in the direction of the arrows labelled 406 to move the robotic arm 402 in the direction 420 and also assume a different shape.

It will be appreciated that this is one example of a sidewinder movement and that other examples are possible. It will additionally be understood that the motion of the arm in direction 420 may be relatively large or small. In addition, and in other aspects, there is no motion in the direction 420 and the sidewinder action simply changes the shape of the robotic arm 402.

Referring now to FIG. 5, one example of a corkscrew motion of a robotic arm 500 is described. Sections of the robotic arm 500 are actuated to cause the robotic arm 500 to move forward in the direction indicated by the arrow labelled 504. The actuation of these sections may be in the direction indicated by the arrows labelled 502. Again, the shape of the robotic arm 500 is caused to assume a corkscrew shape by actuation of selected sections in the robotic arm 500.

Referring now to FIG. 6, one example of an inchworm movement of a robotic arm 602 is described. At state 630, the robotic arm 602 is straight, for example, lying straight in a passage. Next, at state 632, portions of the robotic arm 602 are actuated downward (e.g., against the bottom of a passage) in a push in the direction indicated by the arrows labeled 604 causing the robotic arm 602 to bend upward and also move the robotic arm 602 forward in the direction indicated by the arrow labelled 606.

Then, at state 634, other portions of the robotic arm 602 are actuated downward (e.g., against the bottom of a passage) by a push in the direction indicated by the arrows labeled 604 causing the robotic arm 602 to bend further upward and also move the robotic arm 602 further forward in the direction indicated by the arrow labelled 606. Next, at state 636, the pressure from portions of the robotic arm 602 is relaxed causing the robotic arm 602 to bend downward and also move the robotic arm 602 still further forward in the direction indicated by the arrow labelled 606. Finally, at state 638, the robotic arm 602 is straight and has moved forward relative to state 630.

Figure 7:
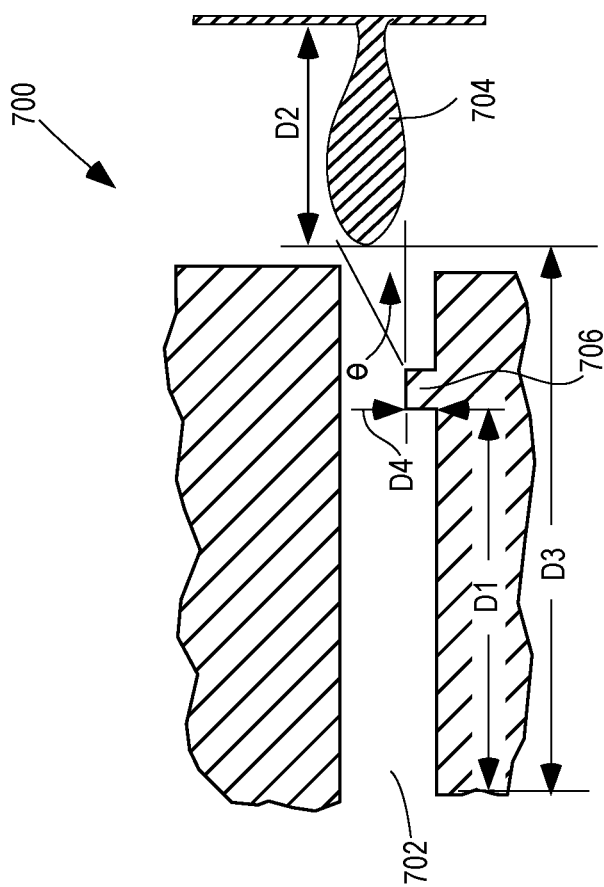
FIG. 7 comprises a diagram as configured in accordance with various embodiments of these teachings.

Referring now to FIG. 7, one example of an environmental map 700 (e.g., environmental map 111) is described. FIG. 7 is a visualization of the environmental map 700 and it will be appreciated that this can be represented electronically in any type of format. For example, the environmental map 700 may be a computer aided design (CAD) file in any appropriate format that describes the environment that a robotic arm is to operate in. In another example, the environmental map 700 is a file created according to a SLAM approach. If a CAD file, the environmental map 700 may be static. However, if created according to SLAM (or other similar) approaches the environmental map 700 dynamically changes over time, for example, from containing less information concerning the environment to including more information concerning the environment in which the robotic arm is operating.

In either case and in this example, the environmental map 700 includes information about a passage 702 with an obstruction 706 that opens to a blade 704. A dimension D1 is the distance from the opening to the obstruction 706. The distance D2 is the length of the blade 704. Theta is an angle of the obstruction 706 with respect to the blade 704. D3 is the distance from the opening of the passage to the tip of the blade 704. D4 is the height of the obstruction 706.

All of this information is included in an appropriate format to represent the environment. As mentioned, the environmental map 700 may physically be a file in any format containing any appropriate data structure that represents the environment, in this case the environment shown in FIG. 7.

Referring now to FIG. 8, one example of a machine learning model 800 is described. The machine learning model 800 includes various nodes 808, 810, 812, 814, 816, 818, 820, 822, 824, 826, 828, 830, 832, and 834 that are interconnected as shown. An environmental map 802 is applied to the node 808. Sensor readings 804, e.g., from a location sensor (e.g., the location sensor 214), are applied to the node 810. User input (e.g., joystick movement) is applied to the node 812. The machine learning model 800 has been trained to produce specific and different control signals 836 as a result of receiving a certain environmental map 802, certain sensor readings 804 and certain user input 806. In examples, the machine learning model 800 is a convolutional neural network. In other examples, the machine learning model 800 uses deep reinforcement learning. Different training sets of training data simulating user inputs and sensor readings may be applied.

In one example, the machine learning model 800 is a neural network and machine learning model 800 is trained by applying training data to the neural network. In one specific example, the machine learning model 800 is a neural network as shown in FIG. 8. The neural network has layers 850, 852, 854 and 856 (each including one or more nodes) and each of the layers performs one or more specific functions. In some aspects, these layers form a graph structure with vectors or matrices of weights with specific values. For instance, the layer 850 may be an input layer receives input signals or data and transfers this information to the next layer 852. One or more other layers 852, 854 perform calculations or make determinations on or involving the data. The layer 856 may be an output layer that produces control signals 836 that produces an arm movement.

Referring now to FIG. 9, one example of the functional operation of a machine learning model (e.g., machine learning model 115) is described. At step 902, various inputs are received. In this case, an environment map input indicates an obstruction in the path of the robotic arm and the dimensions (X) of the obstruction. Sensor reading indicates the position Y of the robotic arm in the passage. User input indicates the user wishes to move the robotic arm forward (e.g., further into the passage from position Y). At step 904, these inputs are applied to a machine learning model (e.g., a trained neural network) and through various calculations and analysis, a determination is formed that the action to be performed is to move portions of the arm over the obstruction using an inchworm-type movement. Thus, a control signal 906 is formed to be applied to the robotic arm to force portions of the arm into an inchworm configuration that will surmount the obstruction. It will be appreciated that this action is determined and implemented without the knowledge or intervention of an operator and may be transparent to the operator.

Referring now to FIG. 10A, FIG. 10B, FIG. 10C, and FIG. 10D one example of controlling a robotic arm 1002 is described. As mentioned, by "traction" and as used herein it is meant support or resistance against relative motion between two objects (e.g., the robotic arm and a passage). For example, traction is provided between the robotic arm and a surface of the passage to propel the robotic arm forward. In another example, traction is provided between the robotic arm and a surface to support the arm against gravity and/or prevent the arm from moving due to gravity.

It will be appreciated that the approaches used can be used for insertion of the robotic arm 1002 into a passage. However, the approaches can also be used to control movement of the robotic arm 1002 out of the passage (once it has been inserted) in a direction generally opposite of the direction of insertion. As mentioned, this is a significant advantage over previous approaches, which relied on a manual extraction (e.g., pulling) of a device from the passage.

The robotic arm 1002 moves along a passage surface 1004. The robotic arm includes a first portion 1006, a second portion 1008, a third portion 1010, and a fourth portion 1012. Each of the first portion 1006, second portion 1008, third portion 1010, and fourth portion 1012 include one or more segments that are actuated as described elsewhere herein. The segment 1012 has a tip 1014 and this is the distal end of the robotic arm 1002. The segment 1006 is at the proximal end of the robotic arm 1002.

In FIG. 10A, the operator is pointing the tip 1014 upwards to view some target or feature (e.g., within an aircraft engine). In FIG. 10B, the operator has moved the robotic arm 1002 forward (compared to FIG. 10A) in the general direction indicated by the arrow labelled 1016 and articulated to look at the target or feature at a lower angle to the horizontal. So far, movement of all segments is "path following" (tip following) since all segments are moving in the same movement as the tip 1014.

In FIG. 10C, however, the operator has moved further forward and articulated down some more. However, the second segment 1008 of the robotic arm 1002 has not curved to follow the path described by the robotic arm 1002 in FIG. 10B. Traction provided by the second segment 1008 allows elevation and angulation of the third segment 1010 and fourth segment 1012 (along with the tip 1014) without requiring the third segment 1010 or fourth segment 1012 to gain traction.

Then, in FIG. 10D, the operator has moved the robotic arm 1002 forward at low level (to the horizontal) again. All the while, the operator is unaware of the flexure of the robotic arm 1002 behind the fourth segment 1012, which was required to enable both the angulation of the tip 1014 and also the elevation of the fourth segment 1012. The operator is also unaware of the positioning and orientation of the near (proximal) end of the fourth segment 1012. The positioning came about automatically without intervention or control of the operator using a machine learning model as described elsewhere herein.

Further aspects of the disclosure are provided by the subject matter of the following clauses:

A system, the system comprising: a robotic arm, the robotic arm being flexible, the robotic arm being inserted into a passage within a part, the robotic arm having multiple degrees of freedom as it moves through the passage; at least one sensor; an actuator coupled to the robotic arm; a controller coupled to the robotic arm, the at least one sensor, and the actuator, the controller is configured to: receive operator instructions defining a tip motion for the tip of the robotic arm; receive sensor readings from the at least one sensor; access an environmental map, the environmental map defining a geometry of portions of the passage; apply the operator instructions, the environmental map and sensor readings to a previously trained machine learning model to produce control signals; and apply the control signals to the actuator on the robotic arm to control a movement of the robotic arm allowing the robotic arm to automatically gain traction in the passage and automatically move within the passage according to the movement.

The system of any preceding clause, wherein the environmental map comprises a computer aided design (CAD) model.

The system of any preceding clause, wherein the environmental map comprises a dynamically changing model.

The system of any preceding clause, wherein the environmental map comprises a hybrid of a computer aided design (CAD) model and a dynamically changing model.

The system of any preceding clause, wherein the at least one sensor comprises a camera.

The system of any preceding clause, wherein the robotic arm is inserted into the passage at an insertion point of the part and wherein the at least one sensor comprises a position sensor positioned at the insertion point, the position sensor determining positions of the robotic arm based upon detecting markings on the robotic arm.

The system of any preceding clause, wherein the movement comprises a sidewinding movement.

The system of any preceding clause, wherein the movement comprises a corkscrew movement.

The system of any preceding clause, wherein the movement comprises an inchworm movement.

The system of any preceding clause, wherein the actuator comprises a user interface that is configured to receive the operator instructions from an operator.

The system of any preceding clause, wherein the robotic arm comprises a tip portion with at least one segment and a proximal portion with multiple segments, wherein selected ones of the multiple segments of the proximal portion provide traction to elevate and/or change an orientation of the tip portion without the tip portion gaining traction from the passage and without operator involvement or control.

A method, the method comprising: inserting a robotic arm into a passage within a part, the robotic arm being flexible and having multiple degrees of freedom as it moves through the passage; at a controller: receiving operator instructions defining a tip motion for a tip of the robotic arm; receiving sensor readings from at least one sensor; accessing an environmental map, the environmental map defining a geometry of portions of the passage; applying the operator instructions, the environmental map and sensor readings to a previously trained machine learning model to produce control signals; and applying the control signals to an actuator on the robotic arm to control a movement of the robotic arm allowing the robotic arm to automatically gain traction in the passage and automatically move within the passage according to the movement.

The method of any preceding clause, wherein the environmental map comprises a computer aided design (CAD) model.

The method of any preceding clause, wherein the environmental map comprises a dynamically changing model.

The method of any preceding clause, wherein the environmental map comprises a hybrid of a computer aided design (CAD) model and a dynamically changing model.

The method of any preceding clause, wherein the at least one sensor comprises a camera.

The method of any preceding clause, wherein the robotic arm is inserted into the passage at an insertion point of the part and wherein the at least one sensor comprises a position sensor positioned at the insertion point, the position sensor determining positions of the robotic arm based upon detecting markings on the robotic arm.

The method of any preceding clause, wherein the movement comprises a sidewinding movement.

The method of any preceding clause, wherein the movement comprises a corkscrew movement.

The method of any preceding clause, wherein the movement comprises an inchworm movement.

The method of any preceding clause, wherein the actuator comprises a user interface that is configured to receive the operator instructions from an operator.

The method of any preceding clause, wherein the robotic arm comprises a tip portion with at least one segment and a proximal portion with multiple segments, wherein selected ones of the multiple segments of the proximal portion provide traction to elevate and/or change an orientation of the tip portion without the tip portion gaining traction from the passage and without operator involvement or control.

Those skilled in the art will recognize that a wide variety of modifications, alterations, and combinations can be made with respect to the above-described embodiments without departing from the scope of the disclosure, and that such modifications, alterations, and combinations are to be viewed as being within the ambit of the inventive concept.

What is claimed is:

1. A system, the system comprising:
   a robotic arm, the robotic arm being flexible, the robotic arm to be inserted into a passage within an engine, the robotic arm having multiple degrees of freedom as it moves through the passage of the engine;
   at least one sensor;
   an actuator coupled to the robotic arm;
   a controller coupled to the robotic arm, the at least one sensor, and the actuator, the controller is configured to:
      receive operator instructions defining a tip motion for a tip of the robotic arm;
      receive sensor readings from the at least one sensor;

access an environmental map, the environmental map defining a geometry of portions of the passage of the engine;

wherein the environmental map further describes positions of moving engine parts with respect to non-moving engine parts within or in proximity to the passage;

apply the operator instructions, the environmental map and sensor readings to a previously trained machine learning model, the model utilizing each of the operator instructions, the environmental map and the sensor readings to automatically select a motion type from a plurality of motion types and produce control signals that describe the selected motion type; and apply the control signals to the actuator for the robotic arm to control a movement of the robotic arm that is made according to the motion type allowing the robotic arm to automatically gain traction in the passage and automatically move within the passage according to the motion type.

2. The system of claim 1, wherein the robotic arm comprises a tip portion with at least one segment and a proximal portion with multiple segments, wherein selected ones of the multiple segments of the proximal portion provide traction to elevate and/or change an orientation of the tip portion without the tip portion gaining traction from the passage and without operator involvement or control.

3. The system of claim 1, wherein the environmental map comprises a computer aided design (CAD) model or a dynamically changing model.

4. The system of claim 1, wherein the environmental map comprises a hybrid of a computer aided design (CAD) model and a dynamically changing model.

5. The system of claim 1, wherein the at least one sensor comprises a camera.

6. The system of claim 1, wherein the robotic arm is inserted into the passage at an insertion point of the engine and wherein the at least one sensor comprises a position sensor positioned at the insertion point, the position sensor determining positions of the robotic arm based upon detecting markings on the robotic arm.

7. The system of claim 1, wherein the movement comprises a sidewinding movement.

8. The system of claim 1, wherein the movement comprises a corkscrew movement.

9. The system of claim 1, wherein the movement comprises an inchworm movement.

10. The system of claim 1, wherein the actuator comprises a user interface that is configured to receive the operator instructions from an operator.

11. A method, the method comprising:

inserting a robotic arm into a passage within an engine, the robotic arm being flexible and having multiple degrees of freedom as it moves through the passage of the engine;

at a controller:

receiving operator instructions defining a tip motion for a tip of the robotic arm;

receiving sensor readings from at least one sensor;

accessing an environmental map, the environmental map defining a geometry of portions of the passage of the engine;

wherein the environmental map further describes positions of moving engine parts with respect to non-moving engine parts within or in proximity to the passage;

applying the operator instructions, the environmental map and sensor readings to a previously trained machine learning model, the model utilizing each of the operator instructions, the environmental map and the sensor readings to automatically select a motion type from a plurality of motion types and produce control signals that describe the selected motion type; and applying the control signals to an actuator on the robotic arm to control a movement of the robotic arm that is made according to the motion type allowing the robotic arm to automatically gain traction in the passage and automatically move within the passage according to the motion type.

12. The method of claim 11, wherein the robotic arm comprises a tip portion with at least one segment and a proximal portion with multiple segments, wherein selected ones of the multiple segments of the proximal portion provide traction to elevate and/or change an orientation of the tip portion without the tip portion gaining traction from the passage and without operator involvement or control.

13. The method of claim 11, wherein the environmental map comprises a computer aided design (CAD) model or a dynamically changing model.

14. The method of claim 11, wherein the environmental map comprises a hybrid of a computer aided design (CAD) model and a dynamically changing model.

15. The method of claim 11, wherein the at least one sensor comprises a camera.

16. The method of claim 11, wherein the robotic arm is inserted into the passage at an insertion point of the engine and wherein the at least one sensor comprises a position sensor positioned at the insertion point, the position sensor determining positions of the robotic arm based upon detecting markings on the robotic arm.

17. The method of claim 11, wherein the movement comprises a sidewinding movement.

18. The method of claim 11, wherein the movement comprises a corkscrew movement.

19. The method of claim 11, wherein the movement comprises an inchworm movement.

20. The method of claim 11, wherein the actuator comprises a user interface that is configured to receive the operator instructions from an operator.

* * * * *